May 17, 1960  J. W. BRANDL  2,936,528
COFFEE BEANS ROASTING MACHINE
Filed June 24, 1957
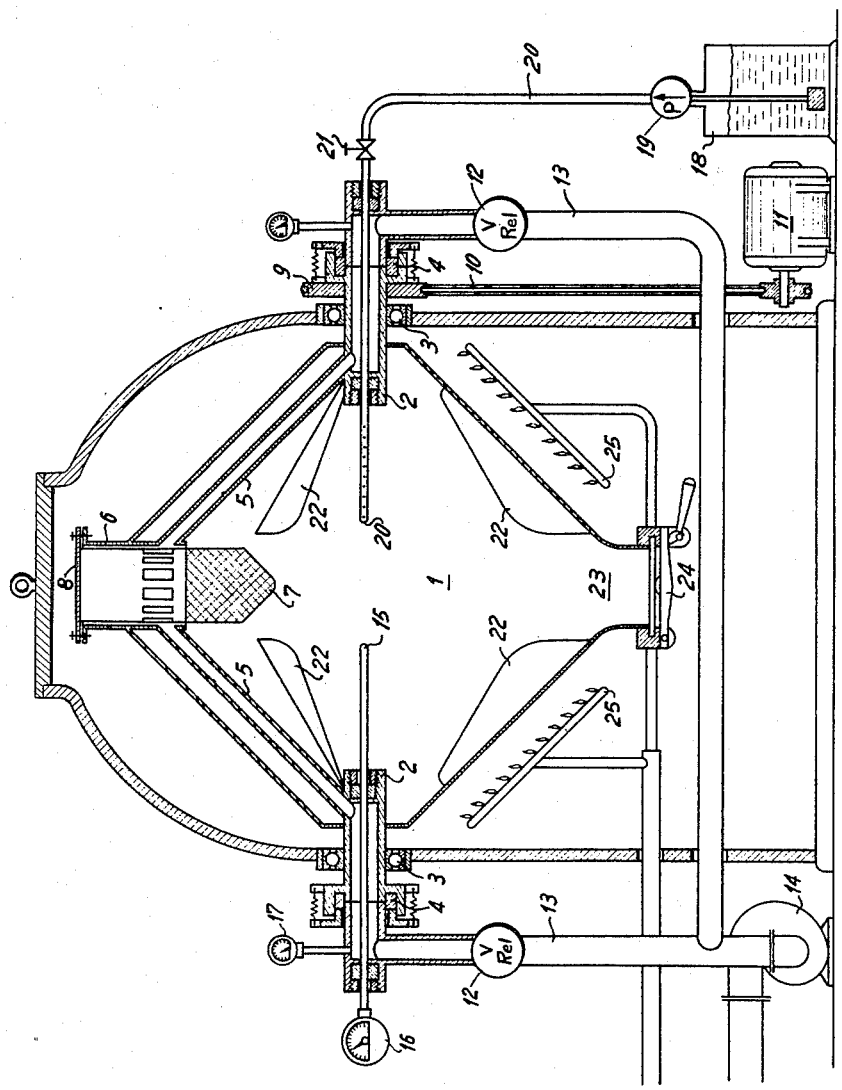

United States Patent Office 2,936,528
Patented May 17, 1960

2,936,528

COFFEE BEANS ROASTING MACHINE

Joseph Wilhelm Brandl, Zurich, Switzerland

Application June 24, 1957, Serial No. 667,658

Claims priority, application Switzerland June 26, 1956

4 Claims. (Cl. 34—63)

The present invention relates to a roasting machine.

The invention has the object of roasting coffee under pressure in order to obtain more aromatic substances and to reduce the roasting losses. This is attained according to the invention in that after the coffee beans have been pre-roasted without pressure, the water vapors generated during the period are drawn off whereupon the roasting is continued under pressure, and that at the end of the roasting a cooling agent is injected at a pressure which is higher than the pressure prevailing in the roasting drum, so that the coffee beans are at least partly cooled without a pressure drop.

In order to be able to carry out this method safely, care must be taken, that in the first place the film formation unavoidable when roasting does not clog the pressure release, and that the water vapors are not pent up when pre-roasting, and can be drawn off unhampered. When the water vapors can not be drawn off unhampered, this has an adverse effect on the coffee in that it does not fully develop during the final roasting or that it becomes too strongly acid.

The roasting machine according to the invention complies with these requirements in that on the rotary roasting drum mounted on hollow stubshafts a sieve body is detachably attached which is connected to vent pipes and is moved across the goods to be roasted, the said stub-shafts being connected on the one hand to the sieve body and on the other hand to the vent pipes, the pipe for the cooling agent being passed through one of the hollow stub shafts.

In the accompanying drawing an embodiment of the invention is diagrammatically illustrated by way of example.

The roasting drum 1 is journalled on hollow stub shafts 2 which are in turn journalled in ball bearings 3. Their free end rotates in a gland 4. The other end of the stub-shafts 2 is connected through pipes 5 with a socket 6 of the roasting drum 1. Into this socket a sieve body 7 can be inserted and secured by means of a closure 8. The sieve body 7 is preferably cylindrical with a conical end. The roasting drum is driven from a motor 11 through a sprocket wheel or V-belt pulley 9 mounted on one stub-shaft 2 and a V-belt or a chain 10. The stub-shafts 2 are connected to the vent pipes 13 through safety- and blow-off valves 12. During the preroasting period these valves are kept open. Moreover in the pipes 13 a fan 14 or other conveyer means is built-in.

Through the left hand side stub-shaft 2 a temperature feeler 15 with indicator instrument 16 is introduced. A pressure gauge 17 likewise connected to this stub shaft 2 indicates the pressure prevailing in the roasting drum 1.

A reservoir 18 for the cooling agent is connected through a pump 19 to a pipe 20, which is passed through the right hand side stub shaft 2, and extends into the roasting drum 1. A valve 21 is built into the pipe 20. As a cooling agent e.g. water or air may be used.

Moreover vanes 22 are provided for thoroughly mixing the goods to be roasted. After the roasting the beans are removed through a discharge socket 23 with closure 24.

As a heating means, gas burners 25 have been illustrated; however other heating elements, e.g. an electrical one, may be provided instead.

The method according to the invention may for example be carried out with this machine as follows:

The goods to be roasted are introduced into the drum 1 through the socket 23. The valve 21 is closed, the valves 12 are open. Thereafter the beans are pre-roasted.

Since the sieve body rotates with the roasting drum 1, it dips intermittently into the coffee beans to be roasted and accordingly cleans itself. In order to prevent clogging completely, the sieve holes or slots may flare out inwardly. The vapor can accordingly always flow out through the two stub-shafts 2. The fan 14 takes care, that the resistances constituted by the sieve ducts and valves, which hamper the evaporation, are overcome and the venting is even artificially promoted, which can only be favorable to the total evaporation of the water from the goods roasted. By this artificially promoted evaporation moreover savings in the heat supply for the heating of the drum are attained. After this period the valves 12 are closed, whereafter the roasting operation proper takes place. The state of the beans can be currently controlled owing to the indicating instruments 16, 17. At the end of this roasting period the pump 19 is started up and the cooling agent is injected under pressure into the drum, when the valve 21 has been opened. The pressure of the cooling agent must naturally be higher than the pressure prevailing in the drum. The beans are accordingly cooled from inside without any pressure drop.

Subsequently the pressure in the drum is completely released, the roasted goods are removed through the socket 23 and are cooled outside the drum in a manner known in itself.

What I claim is:

1. A coffee bean roasting machine comprising a rotary roasting drum wherein the beans are roasted, hollow stub shafts supporting said drum and supported by bearings mounted in the frame of said machine, a sieve body detachably mounted on said drum inside thereof, pipes connecting the inside of said sieve body to the inside of said stub shafts, vent pipes for supplying compressed air to the inside of the said drum, means connecting said vent pipes to said inside of the stub shafts, and a pipe for supplying a cooling agent passed through one of said stub shafts.

2. A coffee bean roasting machine as in claim 1 comprising also a blower connected to said vent pipes and safety valves provided in said vent pipes.

3. A coffee bean roasting machine as in claim 1, wherein the number of pipes connecting said inside of the sieve body to the stub shafts is two.

4. A coffee bean roasting machine as in claim 1 comprising also a safety valve in said pipe for supplying the cooling agent.

References Cited in the file of this patent

UNITED STATES PATENTS

| | | |
|---|---|---|
| 255,965 | Fleury et al. | Apr. 4, 1882 |
| 726,280 | Giacomini | Apr. 28, 1903 |
| 1,602,576 | Gant | Oct. 12, 1926 |
| 1,603,189 | Bruning | Oct. 12, 1926 |
| 2,017,892 | Clary | Oct. 22, 1935 |
| 2,316,208 | Woodruff | Apr. 13, 1943 |